(12) United States Patent
Lewis-Evans et al.

(10) Patent No.: US 9,207,327 B2
(45) Date of Patent: Dec. 8, 2015

(54) SYSTEM AND METHOD FOR LOCATING PHYSICAL ASSETS

(75) Inventors: Jonathan Philip Lewis-Evans, Kowloon (HK); Alexander John Key, Kowloon (HK)

(73) Assignee: Tracker Asia Limited, Hong Kong (HK)

( * ) Notice: Subject to any disclaimer, the term of this patent is extended or adjusted under 35 U.S.C. 154(b) by 290 days.

(21) Appl. No.: 13/579,703

(22) PCT Filed: Feb. 1, 2011

(86) PCT No.: PCT/IB2011/000148
§ 371 (c)(1), (2), (4) Date: Aug. 17, 2012

(87) PCT Pub. No.: WO2011/101717
PCT Pub. Date: Aug. 25, 2011

(65) Prior Publication Data
US 2012/0309422 A1 Dec. 6, 2012

(30) Foreign Application Priority Data

Feb. 19, 2010 (HK) .................................... 10101779

(51) Int. Cl.
*H04W 8/22* (2009.01)
*G01S 19/21* (2010.01)
(Continued)

(52) U.S. Cl.
CPC .............. *G01S 19/16* (2013.01); *B60R 25/1025* (2013.01); *B60R 25/2072* (2013.01);
(Continued)

(58) Field of Classification Search
CPC ....... H04W 4/028; H04W 4/02; H04W 64/00; H04L 67/04; H04L 67/18; H04L 12/2827; H04L 41/0213; H04L 41/046; G01S 5/021; G01S 5/06; G01S 13/825; B60R 25/04; B60R 25/102; B60R 25/33; Y04S 20/228

USPC .......................... 455/456.1, 41.2; 340/539.13
See application file for complete search history.

(56) References Cited

U.S. PATENT DOCUMENTS

| 7,646,295 B1 | 1/2010 | Rana et al. |
| 8,026,814 B1 * | 9/2011 | Heinze et al. .............. 340/572.1 |

(Continued)

*Primary Examiner* — Brandon Miller
*Assistant Examiner* — Joseph Dean, Jr.
(74) *Attorney, Agent, or Firm* — Renner Kenner Greive Bobak Taylor & Weber

(57) ABSTRACT

A stolen asset locating and recovery system comprises: a first locating device (LD) associated with a first asset. The first LD has a first wireless communication unit comprising a public mobile radio network (PMRN) enabled communication unit for communicating over a PMRN such as a GSM/GPRS network with any of: an operations control center; a second LD associated with a second asset; or a mobile location tracking system. The first LD has a second wireless communication unit. The second wireless communication unit uses a different wireless technology or protocol to that of the PMRN enabled communication unit. In the case where the second communication unit is a private radio frequency network (PRFN) operated by the asset location system service provider, the first LD is configured to use said second communication unit to communicate directly over said PRFN with the second LD in order to convey information such as a preprogrammed sequence of signals which assists locating and recovering said asset. In the event that the second communication unit is enabled for communication on a public radio network (PRN), the first LD is configured to communicate with any of the operations control center, the second LD, or the mobile location tracking system on a PRN such as an IEEE802.11 enabled wireless local area network (WLAN) or an IEEE802.16 enabled wireless metropolitan area network when it is determined at the first LD that the communication cannot be transmitted between said first LD and any of the operations control center, the second LD, or the mobile location tracking system using the PMRN.

29 Claims, 2 Drawing Sheets

(51) Int. Cl.
- *G01S 19/16* (2010.01)
- *B60R 25/102* (2013.01)
- *B60R 25/20* (2013.01)
- *G01S 5/00* (2006.01)
- *G01S 19/48* (2010.01)
- *H04W 64/00* (2009.01)
- *H04W 84/02* (2009.01)
- *H04W 84/12* (2009.01)
- *H04W 88/06* (2009.01)

(52) U.S. Cl.
CPC .............. *G01S 5/0072* (2013.01); *G01S 19/21* (2013.01); *G01S 19/48* (2013.01); *B60R 2325/304* (2013.01); *H04W 8/22* (2013.01); *H04W 64/00* (2013.01); *H04W 84/02* (2013.01); *H04W 84/12* (2013.01); *H04W 88/06* (2013.01)

(56) References Cited

U.S. PATENT DOCUMENTS

| | | |
|---|---|---|
| 8,344,879 B2 * | 1/2013 | Harmon et al. .......... 340/539.13 |
| 2004/0023669 A1 * | 2/2004 | Reddy .......................... 455/456.1 |
| 2004/0024644 A1 * | 2/2004 | Gui et al. ......................... 705/22 |
| 2005/0156715 A1 | 7/2005 | Zou |
| 2007/0293243 A1 | 12/2007 | Shyr |
| 2008/0030345 A1 * | 2/2008 | Austin et al. ............... 340/572.8 |
| 2008/0258890 A1 | 10/2008 | Follmer |
| 2010/0029283 A1 * | 2/2010 | Iwamura ...................... 455/437 |

* cited by examiner

SYSTEM AND METHOD FOR LOCATING PHYSICAL ASSETS

FIELD OF THE INVENTION

The invention relates to a system and method for an Asset Location Service Provider 'ALSP' to locate physical assets in an area with no available Public Radio Network 'PRN' coverage due to PRN jamming or insufficient network coverage. Alternatively or additionally, the invention relates to a system and method for an ALSP to be able to locate such assets in an area where there is no global positioning system 'GPS' coverage due to GPS jamming or poor satellite signal reception. The invention is particularly, but not exclusively, related to determining the current location and the subsequent recovery of stolen assets such as motor vehicles.

BACKGROUND OF THE INVENTION

Known asset location and recovery systems typically provide a specialized locating device 'LD' to be associated with an asset such as a motor vehicle which a user, i.e. an ALSP subscriber, may wish to attempt to recover should it be moved without the user's permission, e.g. stolen. In the case of motor vehicles where this technology is best known, the LD is normally located at a secret location within the motor vehicle or at least in or at a part of the vehicle which is not easily accessible without undue effort. Placing the LD at a secret or difficult to access location is intended to prevent a thief from removing and discarding the LD from the asset during the course of stealing it. Preferably, the thief will not realize that the asset has a LD attached to it.

Some known asset locating and recovery systems enable the LD to use a public mobile radio network 'PMRN' such as a global system for mobile telecommunications system 'GSM' to communicate with an operations control centre 'OCC' which is sometimes referred to as a customer service centre 'CSC' or command and control centre 'CCC'. The OCC is the management centre which manages subscribers and which controls asset location and recovery when a report or alert is received that an asset has been stolen, etc. A problem with such an asset location system is that PMRN coverage is not determined by the needs of the ALSP, but instead by the needs of the PMRN operator for its normal mobile radio network subscribers. Consequently, there may be areas within a PMRN with no or poor network coverage or signal reception and these areas may comprise locations where the ALSP requires the ability to transmit to or receive signals from a LD in order to activate, track and locate it once an alert is triggered.

Furthermore, because LDs are normally located in secret or difficult to access locations, thieves often attempt to deliberately jam local PMRN transmissions. Localized PMRN jammers are readily available at inexpensive prices in many countries; even in countries where the use or ownership of such jammers is illegal. If a thief uses such a jammer in close proximity to a LD, it means that, even when the LD in a stolen asset can receive GPS satellite information and determine from the GPS signals its own location, it cannot transmit its GPS location information to an OCC over the PMRN thus rendering the LD ineffective and thereby making stolen asset recovery inefficient or even impossible.

The logical solution to the coverage and jamming problems faced when using a PMRN for communication in an asset location and recovery system is for an ALSP to use a private radio frequency network 'PRFN' and, in fact, this is what many ALSPs do. A PRFN is controlled and operated by the ALSP for only its subscribers and is unlikely to encounter lack of coverage/signal reception issues in the same locations as PMRNs because the ALSP can select where to provide coverage by installing suitable PRFN equipment at appropriate locations according to its own criteria relevant to the nature of the asset requiring protection and the historical experience of its theft or loss. Furthermore, a PRFN does not present the same issues for an ALSP as a PMRN in terms of jamming in that it is much less likely for off the shelf jamming devices to be available to jam a private radio frequency 'PRF'. Furthermore, the transmitter power required of a jammer for jamming high power base station RF transmissions and lower power LD RF transmissions on a PRFN is high. It is difficult to maintain this level of power transmission consistently without expensive, heavy duty equipment and it would be a challenge to use such equipment in a time-sensitive mobile environment such as an asset theft situation. Also, because of the high power needed for jamming, if thieves do attempt to jam the transmission frequency on a PRFN, the ALSP is able to use direction finding techniques to track on the signal generated by the jamming, equipment which defeats the purpose of jamming by assisting in asset location and recovery.

A downside, however, is that deploying a PRFN requires significant capital expenditure in that it necessitates the building and operating of a dedicated network of radio base stations with sufficient density to transmit signals to, and receive signals from, the low power radio transmitter-receivers in LDs of subscriber assets within the ALSP region of operation. The region of operation may be geographically very large and therefore require a considerable number of base stations to be installed. Also, the costs of operating the PRFN are affected by many other factors not encountered by an ALSP with PMRN use such as site rental costs for hardware such as base stations, power and maintenance costs, and software licences.

Some known asset location and recovery systems enable the LDs to receive global positioning system signals in order to determine their GPS locations and report these to the OCC, for example. In certain situations, however, a GPS receiver system in an LD is unable to receive signals from a sufficient number of GPS satellites for the LD to be able to calculate its GPS location. Also, there are many commercially available GPS jammer products that are specifically designed to prevent the reception of the GPS signals that are used to locate assets.

OBJECTS OF THE INVENTION

An object of the invention is to mitigate or obviate to some degree one or more problems associated with known asset location systems.

The above object is met by the combination of features of the main claim; the sub-claims disclose further advantageous embodiments of the invention.

One skilled in the art will derive from the following description other objects of the invention. Therefore, the foregoing statement of object is not exhaustive and serves merely to illustrate some of the many objects of the present invention.

SUMMARY OF THE INVENTION

In a first main aspect of the invention, there is provided an asset location system comprising: a first locating device 'LD' associated with a first asset, said first LD having a first wireless communication unit, said first wireless communication unit comprising a public radio network 'PRN' enabled communication unit for communicating over a first PRN with any of: an operations control centre 'OCC'; a second LD associated with a second asset; or a mobile location tracking system, said first LD including a second wireless communication unit, said second wireless communication unit using a different wireless technology or protocol from that of the first PRN enabled communication unit, the first LD being configured to use said second communication unit to communicate either:

a) directly over a private radio frequency network 'PRFN' with the second LD associated with the second asset where the second communication unit is a PRFN enabled communication unit; or b) with any of the OCC, the second LD associated with the second asset, or the mobile location tracking system on a second PRN using a different technology or protocol to the first PRN;

when a communication cannot be transmitted between the first LD and any of the OCC, the second LD associated with the second asset, or the mobile location tracking system using the first PRN.

A determination that a communication cannot be transmitted between the first LD and any of the OCC, the second LD associated with the second asset, or the mobile location tracking system using the first PRN may be made at the first LD.

Preferably, the second LD associated with the second asset is configured to relay messages between the OCC or the mobile location tracking system and the first LD associated with the first asset using any of the first or second PRNs or the PRFN.

This has the advantage that, if the first LD of the first asset is out of coverage of the first PRN or is being jammed on the first PRN, the first LD may still be able to receive and send messages within the asset location system service area by using the second LD of the second asset as a relay station of sorts. The use of the second LD in the manner mentioned also enables the OCC or any other part of the system including other LDs and the mobile location tracking system to send a message to the first LD to activate it for a direction finding process or any other suitable locating process such that it causes said first LD to implement a pre-programmed sequence of signal transmissions over any available communications medium conveying messages that assist in locating and recovering said first LD and its associated first asset.

The second LD associated with the second asset may be configured to relay messages between the OCC or the mobile location tracking system and the first LD associated with the first asset using a third LD associated with a third asset, said third LD being configured to relay messages between the second LD and the OCC or the mobile location tracking system using any of the first or second PRNs or the PRFN.

This provides the advantage that LDs of various assets within the ALSP service area can 'daisy-chain' to convey messages between the first LD and the OCC or other parts of the system such as other LDs and the mobile location tracking system. It offers the further advantage that each LD in the message chain can select an appropriate communication medium or technology to use for forwarding the message along the chain to the OCC or the mobile location tracking system or even to a law enforcement agency, the choice being affected by such things as local (to the asset doing the message relaying) PNR network coverage, alternative available wireless communication media, etc.

Preferably, the asset location system comprises a plurality of assets with associated LDs wherein a subset of said LDs is configured to form an ad-hoc wireless network to relay messages between the first LD associated with the first asset and the operations control centre or the mobile location tracking system, said ad-hoc wireless network being formed over any one or a combination of the first or second PRNs or the PRFN.

The plurality of LDs may form a mobile ad hoc network 'MANET', i.e. a mobile mesh network. This is a self-configuring network of mobile devices connected by wireless links. The LDs are surprisingly well suited to forming a MANET as each is free to move independently in any direction. Therefore, each is configured using a suitable ad-hoc network protocol to change its links to other LDs frequently and to forward traffic unrelated to its own use. In other words, each LD acts as a small scale router of messages within the service area of the ALSP. Such a network has many surprising advantages over known communication methods used in asset location systems such as fixed telecommunications networks. The mobile mesh network can greatly extend the coverage area of the ALSP and even extend it beyond its normal service area. The mobile mesh network reduces or even eliminates the effect of jamming as the ever changing nature of the connections in the network makes it resistant to efforts to prevent LDs of assets communicating over available communications media. That is it circumvents the single point of failure that a hub normally represents. The LDs of the assets in the mobile mesh network can also be used as the mobile location tracking unit in that data can be derived from their communications with a LD of a "stolen" asset whereby the position of said "stolen" asset may be determined by GPS, signal triangulation or other techniques. At the least, data derived from communications of LDs of other assets with the LD of a stolen asset may assist the OCC in more accurately determining a geographical search area for the mobile location tracking system.

Preferably, the first PRN is a public mobile radio network 'PMRN' such as a GSM/CDMA/GPRS or similar network. Preferably also, the second PRN is a wireless local area network 'WLAN' such as an IEEE802.11 Wi-Fi network or a wireless metropolitan area network 'WMAN' such as an IEEE802.16 Wi-Max network or similar network. Preferably further, the WLAN or WMAN is a publicly accessible WLAN or WMAN. This has the benefit of providing the LD with a second wireless communication capability which may avoid jamming equipment and which also negates the need for the ALSP to operate a PRFN.

WLANs and WMANs operate at the 2.4 GHz or 5 GHz frequencies. As such, the higher frequencies enable faster data transmission speeds which provide many self-evident advantages.

Preferably, the second PRN is a publicly provisioned or subscribable PRN. WLANs and WMANs use service set identifiers 'SSIDs'. A SSID is a unique name shared among all client devices and nodes in such a network. Where the second PRN is a publicly provisioned or subscribable WLAN or WMAN, the asset location system according to the invention may make use of the SSIDs it detects or 'sniffs' when traveling through the coverage areas of WLANs or WMANs. This is advantageous because, where the WLANs or WMANs are publicly provisioned or subscribable services, it means that the networks' locations are publicly known. As such, a detected or sniffed SSID of such a network provides data relating to its geographical location. The LDs of the system of the invention may be configured to use a detected or sniffed SSID or a set of SSIDs to determine approximate location of the asset associated with such LD. The use of SSIDs in this manner is more effective for WLANs such as IEEE802.11 Wi-Fi networks as these have much smaller coverage areas thereby defining a more precise geographical location or area than a SSID for a WMAN. A further advantage of using detected or sniffed SSIDs is that the LD can make use of the geographical location information associated with such SSIDs without necessarily having to use the WLAN or WMAN as a communication medium. In other words, in one arrangement of the system of the invention, the LD may be provided with an ability to detect or sniff SSID's of wireless networks without necessarily being provided with the ability to communicate over said networks, but instead using an alternative communication medium for transmitting location data to other devices in the system.

The same methodology may be applicable to any PRN that uses identifiers to uniquely identify parts of the system where the parts of the system have a known geographical position. For example, base stations in PMRNs have unique identifiers assigned thereto which are received or detected by PMRN enabled communication devices. Therefore, in the system of the invention, the LDs may be provided with means to detect PMRN base station identifiers whereby said identifiers can be employed either locally at the LD or transmitted to the OCC in determining a location for the LD by signal triangulation or other techniques.

The WLAN or WMAN may be connectable to the internet for relaying messages between any of the first or second LDs and any of the OCC, the mobile location tracking system, or another LD associated with another asset. Use of the internet is also beneficial in improving the fault tolerance of the asset location system.

One of the communications media of the asset location system may comprise a PRFN assigned to the asset location system, i.e. one that is operated and maintained for the exclusive use of the ALSP. Although other radio frequency equipment may illicitly use the PRFN, the PRFN is configured to transmit and/or receive signals using coding that prevents interference or corruption of the content of signals transmitted between ALSP subscriber devices via the PRFN.

The OCC may be configured to receive an alert signal from the first LD associated with the first asset indicating unexpected activity relating to the asset. The unexpected activity relating to the asset may be indicative of the asset being moved without permission of the owner of the asset, i.e. an attempt is being made to steal the asset. Triggering of an alert at the LD may therefore be effected by known means such as use of a motion sensor or an accelerometer in the LD and/or the asset detecting unauthorized movement or motion of the LD and/or asset. The OCC preferably uses a unique identifier of the first LD to subsequently activate said first LD for the location determining process by means of a message sent over the first or second PRN or the PRFN to the first LD. The OCC may be configured to send the activation message directly to the first LD over any of the first or second PRNs or the PRFN. Alternatively, the OCC is configured to send the activation message indirectly to the first LD over any of the first or second PRNs or the PRFN via one or more other LDs or a mobile mesh network of LDs.

Preferably, the first LD is configured to receive GPS data from a global position system and to transmit said GPS data or a location locally calculated from said GPS data to said OCC or said mobile location tracking system over said second PRN if said first PRN is not available, or directly or indirectly to the mobile location tracking system over the PRFN or indirectly to the OCC over the PRFN via at least the second LD. Alternatively, the first LD is configured to determine its possible location via a dead reckoning process or a wireless signal triangulation process if no GPS data signals are available.

Preferably, the OCC is configured to identify a possible search area for the mobile location tracking system to use in tracking the first LD based on a last known location of the first LD and taking into account data such as elapsed time since said last known location was received and/or a last known time said asset was at its last known location.

Preferably, the OCC is configured to use reported GPS data from at least the second LD to determine a potential search area for the mobile location tracking system to track the location of the first LD if such data cannot be recovered directly from the first LD. The OCC may be configured to use reported GPS data from a plurality of other LDs associated with other assets which have communicated at some point in time with the first LD to determine a potential search area for the mobile tracking location system. The OCC may make use of triangulated GPS data in determining a potential search area or starting search point for the mobile location tracking system.

The OCC may be configured to use timing information contained in or derivable from communications received from other LDs associated with other assets which have communicated at some point in time with the first LD to determine a potential search area or starting location or position for the mobile tracking location system.

Preferably, the LDs are configured to attempt wireless communication firstly over the first PRN then over the second PRN and then over the PRFN. It is preferred that the first and/or second PRNs are used as a matter of priority over the PRFN, if it exists, in order to maintain a low level of signal traffic on the PRFN to reduce signal collision or interference.

The mobile location tracking system comprises any one or any combination of: a motor vehicle; a small aeroplane, a helicopter, a satellite communication system with a tracking system, or a radio communication system with fixed radio communication towers.

In a second main aspect of the invention, there is provided a locating device 'LD' for an asset location system, said LD comprising: a first wireless communication unit, said first wireless communication unit comprising a public radio network 'PRN' enabled communication unit for communicating over a first PRN with any of: an OCC; a second LD associated with a second asset; or a mobile location tracking system; and a second wireless communication unit, said second wireless communication unit using a different wireless technology or protocol to that of the first PRN-enabled communication unit; wherein said first LD is configured to a) use said second communication unit to communicate directly over a PRFN with the second LD associated with the second asset where the second communication unit is a PRFN-enabled communication unit; or b) communicate with any of the OCC, the second LD associated with the second asset, or the mobile location tracking system on a second PRN using a different technology or protocol to the first PRN;

when a communication cannot be transmitted between the first LD and any of the OCC, the second LD associated with the second asset, or the mobile location tracking system using the first PRN.

In a third main aspect of the invention, there is provided a method of locating an asset using an asset location system in which a first locating device 'LD' is associated with a first asset, said first LD having a first wireless communication unit, said first wireless communication unit comprising a public radio network 'PRN' enabled communication unit for communicating over a first PRN with any of: an OCC; a second LD associated with a second asset; or a mobile location tracking system, said first LD including a second wireless communication unit, said second wireless communication unit using a different wireless technology or protocol to that of the first PRN enabled communication unit, the method comprising:

a) using said second communication unit at said first LD to communicate directly over a private radio frequency network 'PRFN' with the second LD associated with the second asset where the second communication unit is a PRFN enabled communication unit; or b) using said second communication unit to communicate with any of the OCC, the second LD associated with the second asset, or the mobile location tracking system on a second PRN using a different technology or protocol to the first PRN;

when a communication cannot be transmitted between the first LD and any of the OCC, the second LD associated with the second asset, or the mobile location tracking system using the first PRN.

In a fourth main aspect of the invention, there is provided an asset location system comprising: an OCC; a mobile location tracking system; and a plurality of locating devices 'LDs', each LD being associated with a respective asset, each LD being configured to communicate with the OCC, another LD, or the mobile location tracking system using a wireless local area network 'WLAN' or a wireless metropolitan area network 'WMAN'.

In a fifth main aspect of the invention, there is provided a locating device 'LD' for an asset location system, wherein said LD is associated with an asset and comprises a wireless local area network 'WLAN' or a wireless metropolitan area network 'WMAN' enabled communication unit for communicating with any of: an OC; a LD of another asset; or a mobile location tracking system.

In a sixth aspect of the invention, there is provided a method of locating an asset using an asset location system in which a first locating device 'LD' is associated with a first asset, said first LD having a wireless local area network 'WLAN' or a wireless metropolitan area network 'WMAN' enabled communication unit, the method comprising: communicating with any of: an OCC; a LD of another asset; or a mobile location tracking system using said WLAN or WMAN enabled communication unit.

In a seventh main aspect of the invention, there is provided an asset location system comprising: an operations control centre 'OCC'; a mobile location tracking system; and a plurality of locating devices 'LDs', the plurality of LDs being configured to communicate over a wireless communication medium with any of: the OCC; one or more other LDs; and/or the mobile location tracking system, wherein two or more of said LDs are configured to form a mobile mesh network for communicating with the OCC and/or the mobile location tracking system.

In an eighth main aspect of the invention, there is provided a locating device 'LD' for an asset location system, wherein said LD is associated with an asset and comprises a wireless communication unit for communicating with any of: an operations control centre 'OCC'; one or more other LDs; and/or the mobile location tracking system, wherein the LD is configured to form a mobile mesh network for communicating with the OCC and/or the mobile location tracking system.

In a ninth main aspect of the invention, there is provided a method of locating an asset using an asset location system in which a plurality of locating devices 'LDs' are associated with respective assets, some of said LDs having a wireless enabled communication unit for communicating with any of: an operations control centre 'OCC'; one or more other LDs; and/or the mobile location tracking system, the method comprising: forming a mobile mesh network from two or more of said plurality of LDs for communicating with the OCC and/or the mobile location tracking system.

In a tenth main aspect of the invention, there is provided an asset location system comprising: an operations control centre 'OCC'; a mobile location tracking system; and a plurality of locating devices 'LDs', the plurality of LDs being configured to communicate over a wireless communication medium with any of: the OCC; one or more other LDs; and/or the mobile location tracking system, wherein one or more of said LDs is configured to obtain identifier data from one or more fixed devices in a wireless communication network and to either: a) determine locally an approximate location for said LD based on said obtained identifier data; or b) transmit said obtained identifier data to another device in the asset location system to enable said another device to determine remotely an approximate location for said LD based on said obtained identifier data.

This aspect of the invention is advantageous in that it makes use of publicly obtainable information from public networks and publicly available knowledge of the location of said networks or devices within said networks to enable a LD to either locally determine its approximate location using said obtained information or to pass said obtained information onto another device in the asset location system to have said approximate location determined locally at said another device.

In an eleventh main aspect of the invention, there is provided a locating device 'LD' for an asset location system, wherein said LD is associated with an asset and comprises a wireless communication unit for communicating with any of: an operations control centre 'OCC'; one or more other LDs; and/or the mobile location tracking system, wherein the LD is configured to obtain identifier data from one or more fixed devices in a wireless communication network and to either: a) determine locally an approximate location for said LD based on said obtained identifier data; or b) transmit said obtained identifier data to another device in the asset location system to enable said another device determine remotely an approximate location for said LD based on said obtained identifier data.

In a twelfth main aspect of the invention, there is provided a method of locating an asset using an asset location system in which a plurality of locating devices 'LDs' are associated with respective assets, some of said LDs having a wireless enabled communication unit for communicating with any of: an operations control centre 'OCC'; one or more other LDs; and/or the mobile location tracking system, the method comprising: at one of said LDs, obtaining identifier data from one or more fixed devices in a wireless communication network and either: a) determine locally at said LD an approximate location for said LD based on said obtained identifier data; or b) transmitting said obtained identifier data from said LD to another device in the asset location system to enable said another device determine remotely an approximate location for said LD based on said obtained identifier data.

In a thirteenth main aspect of the invention, there is provided an asset comprising part of an asset location system, wherein said asset has integrated therewith a locating device 'LD' according to any of the second, fifth, eighth or eleventh main aspects of the invention.

The locating device may comprise a transponder.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
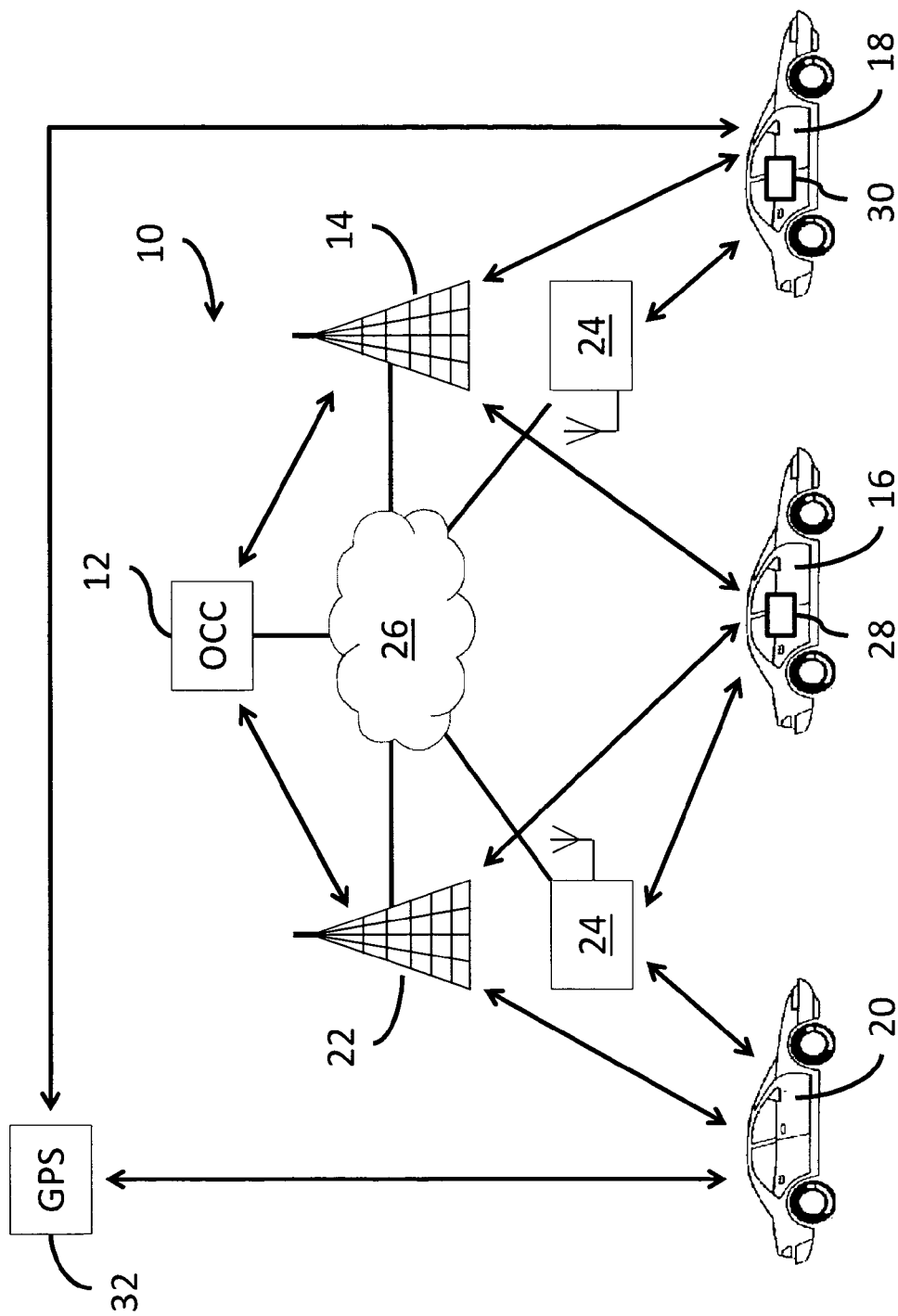
FIG. 1 is a schematic block diagram of an asset location system according to the invention.

The following description is of a preferred embodiment by way of example only and without limitation to the combination of features necessary for carrying the invention into effect.

Generally speaking, the invention concerns a system and method for an Asset Location Service Provider 'ALSP' to locate physical assets in an area with no available Public Radio Network 'PRN' telecommunications coverage due to PRN jamming or insufficient network coverage. Alternatively or additionally, the invention relates to a method and system for an ALSP to be able to locate such assets in an area where there is no GPS coverage due to GPS jamming or poor satellite signal reception. The invention also relates to a system and method for determining the location and the subsequent recovery of stolen assets such as motor vehicles, although the invention can equally well be used with other physical assets.

A physical asset may comprise: a motor vehicle of any type including an automobile, a boat, etc.; a person; an animal; cargo including containerized goods; manufacturing, construction or agricultural plant or machinery; bank money delivery boxes; or any other item that has value to an asset owner sufficient to warrant subscription to an asset location and recovery system for recovery of the asset in the event it is stolen or removed without the owner's permission. One skilled in the art will understand that the asset location system according to the invention merely requires a suitable LD to be associated with an asset of any type in order for the system to track and locate said LD and by inference the asset associated with the LD. The skilled person will also understand that, with the increasing miniaturization of electronic circuitry and devices, many opportunities arise for secreting a suitably adapted LD on or in an asset. This may involve integrating the LD into the asset to tap into the asset's power supply or it may involve providing the asset with an independent power supply, possibly comprising long life batteries or the like. In the case of a person, for example, the LD may be secreted in the lining of clothing or even secreted or integrated into a personal electronic product such as a laptop computer, personal digital assistant or mobile phone, for example. It may even be implanted under the skin as is already done with pets. A locating device as will be described hereinbelow is installed, worn or somehow associated with such an asset or a group of such assets. Where the assets are containerized, for example, the LD may be associated with the container or one of the group of containerized assets. Hereinafter, the description will refer to motor vehicles as the physical assets and theft as the cause or circumstance of unauthorized or unintended removal or loss merely by way of illustration.

By private radio frequency network 'PRFN' is meant operational management control of a private radio/wireless system remains with the equipment owner, system administrator, or service provider.

Referring to FIG. 1, shown is a schematic block diagram of an asset location system 10 according to the invention. The system 10 comprises an operations control centre 'OCC' 12 for managing subscribers and for vehicle locating and recovery processes, an optional private radio frequency network 'PRFN' 14, a first motor vehicle 16, a second motor vehicle 18 and a tracking vehicle 20 comprising a mobile location tracking system. The first and second vehicles 16, 18 are representative of a plurality of subscribers' vehicles. The OCC 12 may be a server based system including processing means for implementing computer readable instructions for implementing the methods hereinafter described and including at least one database (not shown) for maintaining subscribers' data, etc.

It will be understood that the tracking vehicle 20 could be replaced or supplemented by an airborne surveillance and tracking system (not shown) or even replaced or supplemented by a satellite tracking system (not shown).

Associated with the asset location system 10 is an optional first public radio network 22 'PRN' which preferably comprises a public mobile radio network 'PMRN' such as a GSM/GPRS network. The first PRN 22 is mentioned as being associated with the asset location system 10 rather than comprising part of said system as it comprises a public system accessible to any subscribers of the system 22 in a known manner and is not exclusive to the asset location system 10 or operated exclusively by or on behalf of the ALSP. As such, the asset recovery system 10 preferably uses as its primary communication medium the PMRN which is provided, maintained and operated by a different service provider to the asset location service provider 'ALSP', although, in some embodiments, the primary communication medium of the asset location system 10 may comprise the PRFN 14. In other embodiments, the PRFN 14 is a secondary communications medium of the system 10.

Also associated with the asset location system 10 is an optional second PRN 24 which preferably comprises one or more wireless local area networks 'WLANs' enabled to use the WiFi IEEE802.11 standard set of communication protocols, although it will be understood that the WLANs could comprise any type of WLAN or that the second PRN 24 may not comprise a WLAN but may comprise a second PMRN or some other type of PRN. Furthermore, the second PRN 24 may comprise one or more wireless metropolitan area networks 'WMANs' enabled to use the Wi-Max IEEE802.16 standard set of communication protocols. A WMAN has the advantage over a WLAN of greater area of coverage per WMAN. However, a WLAN has an advantage over a WMAN of being of a small size geographically such that any reported contact of a LD with a WLAN infers a small geographical search area for said LD based on the location of said WLAN. The second PRN 24 is also a publicly accessible system, publicly provisioned system (free to use) or publicly subscribable to system and is one which uses a different technology or communications protocol to that of the first PRN 22. The optional second PRN 24 may replace or augment the optional first PRN 22 and/or the optional PRFN 14. The second PRN 24 may comprise the secondary communications medium of the system 10 with the optional PRFN 14 comprising a tertiary communications medium of the system 10, although, in some embodiments, the second PRN 24 or the PRFN 14 comprises the primary and possibly only communication medium of the asset location system 10. The optional second PRN 24 may be linked directly to the OCC 12 or indirectly linked to the OCC 12 via the internet 26 or via a backbone communications system (not shown). The second PRN 24 may be enabled to convey internet protocol 'IP' communications between the first and second vehicles 16, 18 and the OCC 12 and the tracking vehicle 20.

The first vehicle 16 has a locating device 28 associated therewith. The second vehicle 18 also has a second LD 30 associated therewith. Whilst only two vehicles 16, 18 are shown, the system 10 has a plurality of subscribers each being provided with a respective LD for attaching to their respective vehicle (not shown). Each LD 28, 30 in the system 10 has a unique identifier or code to enable the OCC 12 to send and receive communications to and from said LDs 28, 30 and to identify and locate it. The first and second LDs 28, 30 may comprise transponders.

Preferably, also associated with the asset location system 10 is a global positioning satellite system 'GPS' 32. Each LD 28, 30 may have an optional GPS receiver (FIG. 2) for receiving satellite signals from the GPS system 32 and processing circuitry enabling the LD to locally calculate its GPS position/location using the received GPS satellite signals.

It will be noted that, whilst many of the possible communication links between devices and systems depicted in the drawings are indicated by arrowed lines, not all possible communication links are shown for reasons of convenience and clarity.

Figure 2:
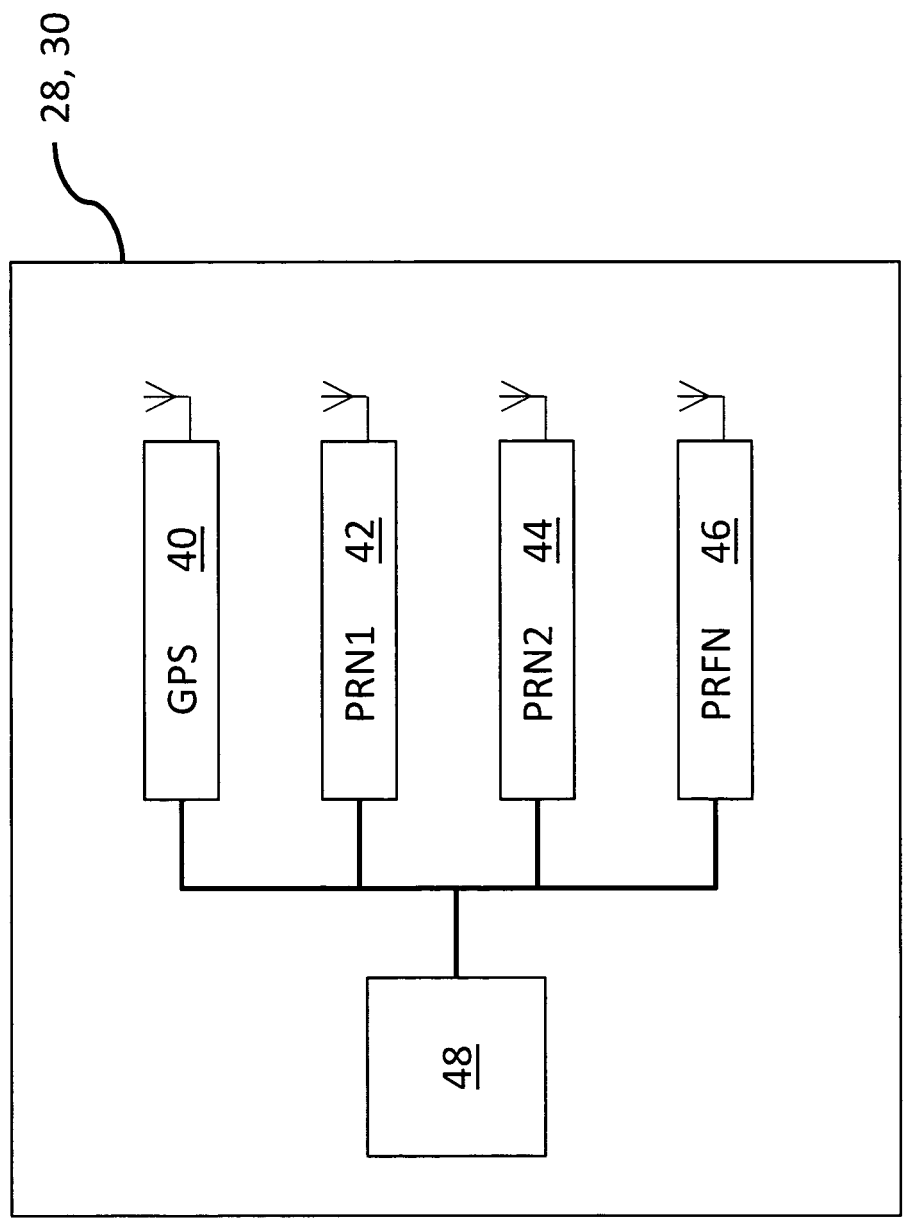
FIG. 2 is a block schematic diagram of a locating device 'LD' for use in the system of FIG. 1.

FIG. 2 is a block schematic diagram of a typical LD 28, 30 for associating with a vehicle 16, 18 in the system 10 of the invention. The LD 28, 30 comprises an optional GPS receiver 40, an optional first wireless communication unit 42 enabled to communicate over the first PRN 22, an optional second wireless communication unit 44 enabled to communicate over the optional second PRN 24 using a different technology or protocol to that of the first PRN 22, an optional PRFN (transceiver) wireless communication unit 46 enabled to communicate over the optional PRFN 14, and control and processing circuitry 48 programmed with computer readable instructions for implementing the methods hereinafter described. The GPS receiver 40, the first wireless communication unit 42, the second wireless communication unit 44 and the PRFN wireless communication unit 46 are, when included in the LD 28, 30, interconnected with each other and the control and processing circuitry 48 such that message information received by one such unit can be passed to another such unit for processing and transmission over a suitable communications medium. For example, the GPS receiver 40 is able to receive GPS satellite signals and to forward these to the control and processing circuitry 48 to allow a local current GPS position of the vehicle 16, 18 to be calculated wherein the control and processing circuitry 48 is then able to pass the calculated local current GPS position data to any of the communication units 42, 44, 46 to enable local current GPS position data to be sent to any of the OCC 12, another LD 30 or the tracking vehicle 20.

It will be understood that the LD 28, 30 according to the invention has at least one of the optional first wireless communication unit 42, the optional second wireless communication unit 44 and the optional PRFN wireless communication unit 46 as its preferred primary and possibly only means of wireless communication.

In one arrangement according to one aspect of the invention, the asset location system 10 is configured such that each LD 28, 30 has a PRFN transceiver (transmitter-receiver) wireless communication unit 46 connected to a PMRN enabled LD 28, 30. Consequently, each of the LDs 28, 30 includes a PMRN wireless communication unit 42 for communicating over the PMRN 22 with any of: the OCC 12, other LDs 28, 30 and the tracking vehicle 20. The LDs 28, 30 are configured to use their respective PRFN communication units 46 to communicate directly over the PRFN 14 with any of the other LDs 28, 30 associated with other vehicles 16, 18 or the tracking vehicle 20 when a communication cannot be transmitted between said LDs 28, 30 and any of the OCC 12, other LDs 28, 30, or the tracking vehicle 20 using the PMRN 22.

In this arrangement of the system 10 according to the invention, the PRFN 14 may be used to transmit alerts, location information or activation/de-activation or other local function commands (such as audible alarms, fuel-cuts, door locking and the like) from the LDs 28, 30 at such times when the option to transmit over the PMRN 22 is unavailable due to localized PMRN jamming or PMRN coverage black spots.

In this arrangement of the system 10 according to the invention, the LDs 28, 30 of ALSP subscribers may be used to form a PRFN chain, capable of receiving and relaying short range RF transmissions from a stolen LD 28 and then forwarding that information, either continuing on the PRFN 14 in a daisy chain or by the PMRN 22, if available at another LD 30, in the daisy chain if that ALSP subscriber's LD 30 is not itself PMRN jammed or in a PMRN coverage black spot.

In this arrangement of the system 10 according to the invention, LDs 30 of other ALSP subscribers may be used to control the stolen LD 28 at short range via the daisy chained PRFN 14. Signals can be sent to all or a selected subset of subscriber LDs 30 via the PMRN 22 and these can then broadcast instructions to the stolen LD 28 via their own PRFN units 42. The OCC 12 can select a subset by using the unique identifiers assigned to the LDs 28, 30 to activate those that are conveniently located in or near the determined geographical search area.

In this arrangement of the system 10 according to the invention, the known location of a second subscriber LD 30 may be used as a proxy for the stolen LD's location. In the event of PMRN jamming, the tracking vehicle 20 can be sent to the proximity or current location of the proxy LD 30 which may be the vehicle 18 considered as being the closest to the last known location of the stolen vehicle 16. The tracking vehicle should then be able to receive a signal from the stolen LD 28 on the PRFN 14 and be able to locate the stolen vehicle 16 using direction finding or other known techniques familiar to the skilled artisan.

In this aspect of the invention, the novelty resides in the addition of an alternative PRFN transmission and reception capability to each LD 28, 30 for the purpose of circumventing the weaknesses of the PMRN 22 in coverage and jamming, while retaining the economic benefits to an ALSP of using a PMRN 22 as its primary geographic network for communicating with the LDs 28, 30.

In operation of this arrangement, if the OCC 12 or a subscriber to the asset location system 10 becomes aware that say the first vehicle 16 may have been lost or stolen, the OCC 12 or said subscriber may request status and location data for the stolen first vehicle 16 through the PMRN 22. After a period of time, the OCC 12 will return to the requestor the status and location data for the stolen first vehicle 16 if this is has been received or is easily determinable. However, if no up to date status and location data is returned or easily determinable, the OCC 12 may examine a last known location of the first vehicle 16 and the time it was at that location. Based on the last known location and the elapsed time since the first vehicle 16 was at its last known location, the OCC 12 may determine a geographical area within which the stolen asset is expected to be currently located.

The OCC 12 then requests all other vehicles such as the second vehicle 18 and possibly the tracking vehicle 20 within the determined geographical search area to begin polling the first vehicle 16 requesting it to provide its current location and status. These other subscriber vehicles 18 and the tracking vehicle 20 if utilized preferably make requests on the PRFN 14 to avoid jamming on the PMRN 22. The transmissions from the other vehicles 18, 20 are preferably continued in a preprogrammed pattern or a pattern controlled by the OCC 12 through control messages forwarded to the vehicles 18, located within the geographical search area until such time as the LD 28 of the first vehicle 16 acknowledges receipt of any one of the transmitted messages from any of the other vehicles 18, 20 and provides its location to the OCC 12 via the PMRN 22, the PRFN 14 or any other communication medium that may be determined as being available by the first vehicle LD 28. Alternatively or additionally, the LD 28 of the first vehicle 16 on receiving any of the messages from any of the other vehicles LDs 18, 20 or even from the OCC 12 provides its location information to another one of the vehicles LDs 30 or to the tracking vehicle 20 via the PRFN 14. The initial messages transmitted by the OCC 12 and the LDs 30 of the other vehicles 18, 20 may comprise an activation message which, when received by the LD 28 of the first vehicle 16, awakens the LD 28 and causes it to commence transmitting its location information in accordance with a preprogrammed sequence of transmissions on a selected communication medium or on any communication medium as determined locally as available by the LD 28 of the first vehicle 16.

The pattern of transmissions from the LDs 30 of other vehicles 18, 20, and the number of other LDs 30 selected to transmit within each sector of the identified geographical search area may be selected to maximize the possibility of contacting the first LD 28 of the first vehicle 16 while simultaneously minimizing the possibility of network degradation by colliding return transmissions from the LD 28 of the first vehicle 16 on the PRFN 14.

The OCC 12 may regularly expand the geographical search area and pool (subset) of other subscriber vehicles 18 looking for the stolen vehicle 16, as elapsed time since last confirmed location of the stolen vehicle 16 increases, to allow for additional distance the stolen vehicle may have traveled.

The LD 28 of the first 'stolen' vehicle 16 may be configured such that, when the first LD 28 receives such a request from another LD 30, or it determines locally through its control and processing circuitry 48 that the first vehicle 16 with which it is associated has been subject to unauthorized removal (e.g. stolen), it attempts to transmit its location and status by both the PMRN 22 and the PRFN 14. Furthermore, the LD 28 may be configured to self-activate to transmit its location and status upon locally determining that a theft situation may be in progress rather than awaiting receipt of an activation message from the OCC 12.

In the event that the OCC 12 or the tracking vehicle is able to receive location information direct from the LD 28 of the first vehicle 16 via the PMRN 22 or the PRFN 14 then a normal tracking and recovery procedure can be followed using the tracking vehicle 20 and/or a law enforcement agency.

If, however, the OCC 12 is not able to receive actual location information from the first LD 28, but is able to receive messages or at least a radio signal from the first LD 28 of the first vehicle 16 via the LD 30 of the second vehicle 18 over the PRFN 14 then a novel tracking procedure may be implemented.

In this novel procedure, GPS location information from the stolen vehicle 16 and/or from any other vehicles 18 whose LDs 30 are able to communicate with the LD 28 of the first vehicle 16 are provided to the OCC 12 and/or the tracking vehicle 20. The other LDs 30 may use any suitable communication medium locally available to them to forward such GPS data to the OCC 12 and/or the tracking vehicle 20 including daisy chaining the information over the PMRN 22 and/or the PRFN 14 to other LDs of other vehicles. This novel process will either provide an accurate GPS location from the LD 28 of the first vehicle 16 itself or allow an approximate location to be calculated or deduced from the GPS location data reported by the other LDs. Consequently, the tracking and recovery vehicle 20 can be sent to the location, which can be kept updated as updated GPS location data is reported to the OCC 12 and/or tracking vehicle 20.

In the absence of accurate GPS location data from the LD 28 of the first vehicle 16 itself, the LD 28 may be configured to poll nearby LDs 30 using the PRFN 14 to determine locally its approximate current location using signal triangulation or other known techniques. The LD 28 having made such a local calculation or determining of its approximate location may transmit this information to the OCC 12 or the tracking vehicle 20 either via the PMRN 22 if that becomes locally available or via the PRFN 14 via one or more other nearby LDs 30 via a daisy chain or ad-hoc network RF connection whereby such approximate location information helps the OCC 12 and/or the tracking vehicle 20 to narrow the search area.

Furthermore, the LD 28 of the first vehicle may be configured to measure signal strength from nearby LDs 30 and to use said received signal strength 'RSS' measurements to approximate its location. Alternatively, the other LDs may be configured to take respective signal strength measurements of the first LD 28 over the PRFN 14 and to report these to the OCC 12 and/or the tracking vehicle 20 such that said OCC 12 or tracking vehicle 20 can use the RSS measurements to calculate an approximate location for the first LD 28. Such a calculation may be useful where the GPS receiver of the first LD 28 is being jammed or the GPS receiver is otherwise unable to receive sufficient GPS signals to determine its current GPS location.

The tracking vehicle 20 may, in the absence of an actual GPS location for the first LD 28 use radio direction finding on a signal transmitted by the first LD 28 on the PRFN 14 to determine the current location of the first LD 28 and, by inference, the first vehicle 16. In the event that the PRFN 14 is being locally jammed by a thief's high power jamming equipment in the first vehicle 16 during the course of stealing it, the ASLP would be able to track the local jamming signal, thus allowing the first vehicle to be located using the thief's RF jamming signal.

The foregoing arrangement of the invention provides a significant number of benefits over known asset location and recovery systems. These include providing a means of reducing the need to install a fixed radio network infrastructure by utilizing LDs in subscribers' vehicles as intermediate relay stations to provide additional transmission and reception coverage in areas where these customer vehicles are located.

The foregoing arrangement of the invention provides a means of combating jamming or areas of no coverage black spots on a single communications channel by utilizing two independent RF transmission channels for communication.

The foregoing arrangement of the invention provides a means of determining the location of a stolen asset where a GPS jammer is in use by a thief.

The foregoing arrangement of the invention provides a means of determining the location of a stolen asset where a PMRN (e.g. GSM) jammer is in use by a thief.

The foregoing arrangement of the invention provides a system that optimizes channel transmission rates to maximize probability of successful communications to and from a LD of a stolen asset.

The foregoing arrangement of the invention provides a means of allowing for the geographical search area in which a stolen asset may be located to be expanded intelligently with elapsed time since a last confirmed location of the stolen asset increases.

The LD of a stolen asset may be configured to use one or more different methods to determine its current location or to allow its current location to be tracked once it is activated. The LD is provided with a wireless communication capability to enable it to transmit location information back to the OCC. The LD can be activated by a message from the OCC. The activation message from the OCC may be issued in response to an alert message received at the OCC from an asset owner or law enforcement agency in response to a realization that the asset has been removed without permission or in response to a signal received from other means as a motion sensor or accelerometer associated with the asset detecting unauthorized movement or motion of the asset. Other methods for activating the LD will be known to one skilled in the art such as 'geo-fencing' (detecting if the asset is moved outside a predetermined geographical area.

It can be seen therefore that, in at least one aspect, the invention provides an asset location system comprising: a first locating device 'LD' 28 associated with a first asset 16, said first LD 28 having a first wireless communication unit 42, said first wireless communication unit 42 comprising a public radio network 'PRN' enabled communication unit for communicating over a first PRN 22 with any of: an operations control centre 12; a second LD 30 associated with a second asset 18; or a mobile location tracking system 20, said first LD 28 including a second wireless communication unit 44, 46, said second wireless communication unit 44, 46 using a different wireless technology or protocol to that of the first PRN enabled communication unit 42, the first LD 28 being configured to use said second communication unit 44, 46 to communicate directly over a private radio frequency network 'PRFN' 14 with any of the second LD 30 associated with the second asset 18 or the mobile location tracking system 20 where the second communication unit is a PRFN enabled communication unit 46 or to communicate with any of the operations control centre 12, the second LD 30 associated with the second asset 18, or the mobile location tracking system 20 on a second PRN 24 using a different technology or protocol to the first PRN 22 when a communication cannot be transmitted between the first LD 28 and any of the operations control centre 12, the second LD 30 associated with the second asset 18, or the mobile location tracking system 20 using the first PRN 22.

It can also be seen that the second LD 30 may be configured to relay messages between the operations control centre 12 or the mobile location tracking system 20 and the first LD 28 using a third LD associated with a third asset, said third asset being configured to relay messages between the second LD 30 and the operations control centre 12 or the mobile location tracking system 20 using any of the first or second PRNs 22, 24 or the PRFN 14.

This provides the advantage that LDs of various assets within the ALSP service area can 'daisy-chain' to convey messages between the first LD and the OCC or other parts of the system such as other LDs and the mobile location tracking system. It offers the further advantage that each LD in the message chain can select an appropriate communication medium or technology to use for forwarding the message along the chain to the OCC or the mobile location tracking system or even to a law enforcement agency, the choice being affected by such things as local (to the asset doing the message relaying) PNR network coverage, alternative available wireless communication media, etc.

The asset location system 10 is seen to comprises a plurality of assets 16, 18 with associated LDs 28, 30 wherein a subset of said LDs may be configured to form an ad-hoc or mobile mesh wireless network to relay messages between the first LD associated with the first asset and the operations control centre or the mobile location tracking system. The mobile mesh wireless network may be formed over any one or a combination of the first or second PRNs 22, 24 or the PRFN 14. The plurality of LDs may form a mobile ad hoc network 'MANET' or a mobile mesh network. The LDs 28, 30 of the assets 16, 18 in the mobile mesh network can also be used as the mobile location tracking system 20 in that data can be derived from their communications with a LD 28 of a "stolen" asset 16 whereby the position of said "stolen" asset 16 may be determined by signal triangulation or other techniques.

It can also be seen that the first LD 28 is configured to receive GPS data from the global positioning system and to transmit said GPS data or a location locally calculated from said GPS data to said operations control centre 12 or said mobile location tracking system 20 over said second PRN 24 if said first PRN 22 is not available, or directly or indirectly to the mobile location tracking system 20 over the PRFN 14 or indirectly to the operations control centre 12 over the PRFN 14 via at least the second LD 30. Alternatively, the first LD 28 is configured to determine its possible location via a dead reckoning process or a wireless signal triangulation process if no GPS data signals are available.

The operations control centre 12 may be configured to identify a possible search area for the mobile location tracking system 20 to use in tracking the first LD 28 based on a last known location of the first LD 28 and taking into account data such as elapsed time since said last known location was received and/or a last known time said asset was at its last known location. The operations control centre 12 may be configured to use timing information contained in or derivable from communications received from other LDs 30 associated with other assets 18 which have communicated at some point in time with the first LD 28 to determine a potential search area or starting location or position for the mobile tracking location system 20.

In one arrangement according to another aspect of the invention, the asset location system 10 is adapted to use the second PRN 24 as its primary and possibly only communication medium between the OCC 12 and the subscribers' vehicles 16, 18 where said PRN 24 comprises one or more wireless local area networks 'WLANs' or one or more wireless metropolitan area networks 'WMANs' and, more particularly, one or more publicly accessible WLANs or WMANs. The one or more WLANs may be enabled to use the WiFi IEEE802.11 standard set of communication protocols, although it will be understood that the WLANs could comprise any type of WLAN. Similarly, the WMANs may be enabled to use the WiFi IEEE802.16 standard set of communication protocols, although it will be understood that the WMANs could comprise any type of WMAN. The one or more WLANs or WMANs may be linked to the OCC 12 via the internet 26 or via a backbone communications system (not shown).

This arrangement has the benefit of negating the need to install a dedicated PRFN for the ALSP and is particularly useful in countries where there are movements to implement widely free WiFi LAN Wi-Max MAN access. Consequently, this arrangement according to the invention enables a ALSP to significantly reduce capital set-up costs compared to an asset location system which requires a dedicated PRFN.

In some arrangements of the system 10 of the invention, the proposed PRFN communication unit 46 in each LD may be replaced by a WiFi or Wi-Max enabled transceiver (the second wireless communication unit 44). Use of WiFi or Wi-Max has significant other unexpected advantages. It enables the ALSP to easily configure or update the LD 28, 30 inside the vehicle 16, 18 without removal because of the higher data transfer speeds available using WiFi or Wi-Max than is the case for PRFN transceivers. For example, software updating of LDs could be performed wirelessly over any of the wireless networks rather than locally at each LD. It would also enable the use of commercially available WiFi or Wi-Max sniffer devices to be utilized to determine RSS measurements for tracking or approximate location calculation purposes or to obtain one or more SSIDs from wireless networks being traversed by the LD of a stolen asset.

In this latter arrangement where the LD is enabled to 'sniff' out SSIDs or the like, the LD may be arranged to either: a) determine locally an approximate location for said LD based on said obtained identifier data; or b) transmit said obtained identifier data to another device in the asset location system to enable said another device determine remotely an approximate location for said LD based on said obtained identifier data.

This arrangement is advantageous in that it makes use of publicly obtainable information from public networks and publicly available knowledge of the location of said networks or fixed position devices within said networks to enable a LD to either locally determine its approximate location using said obtained information or to pass said obtained information on to another device in the asset location system to have said approximate location determined locally. In such a case, the LD may not necessarily be enabled to communicate over the wireless network but simply enabled to 'sniff' out SSIDs.

Where a wireless network is a publicly subscribable to or publicly provisioned (free to use network) it has fixed devices such as access points, routers, base stations which are assigned unique identifiers. The locations of the devices with such identifiers are often public known, being commonly available through services such as Google maps or the like. Therefore, as indicated above, a LD enabled to sniff out SSIDs or other unique identifiers for fixed assets of known geographical location can use the obtained identifier data to either locally to access location data associated with said identifier data and determine its approximate location or to transmit said identifier data to the OCC or the mobile location tracking system such that these devices can remotely (to the LD) determine its approximate location. It will be understood that a single SSID or other identifier data could still enable a small geographical search area to be determined for locating the LD or, where two or more SSIDs or identifier data are obtained, to triangulate the locations associated with said data and determine fairly accurate a location for the LD.

In some arrangements of the system 10 of the invention, the tracking vehicle 20 may be configured to cause the LD 28 of the first vehicle 16 being tracked as stolen to activate in the vehicle 16 an audible alarm preferably of a high decibel level to allow the vehicle to be pinpointed using the audible alarm signal. The tracking vehicle 20 may be configured to cause activation of the LD 28 to initiate the audible alarm when the tracking vehicle is or considers that it is in close proximity to the tracked location of the first vehicle 16. The tracking vehicle 20 may also use such a signal to implement fuel cut off in the first vehicle 16.

In some arrangements of the system 10 of the invention, the other LDs 30 that assist in daisy chaining PRFN signals between the LD 28 and the OCC 12 and/or tracking vehicle 20 may be configured to only communicate using the PRFN 14 when they determine locally that they cannot communicate over alternative PRN communication means. In such a case, the LDs 30 may be configured to communicate only minimal information over the PRFN 14 in order not to saturate the PRFN RF channels. But are configured to save unsent data until they again determine that another communication medium such as a PRN has become available whereby they then send the saved information to the OCC 12 and/or tracking vehicle 20.

In general, the invention provides a stolen asset locating and recovery system comprising: a first locating device 'LD' associated with a first asset. The first LD has a first wireless communication unit comprising a public mobile radio network 'PMRN' enabled communication unit for communicating over a PMRN such as a GSM/GPRS network with any of: an operations control centre; a second LD associated with a second asset; or a mobile location tracking system. The first LD has a second wireless communication unit. The second wireless communication unit uses a different wireless technology or protocol to that of the PMRN enabled communication unit. In the case where the second communication unit is a private radio frequency network 'PRFN' operated by the asset location system service provider, the first LD is configured to use said second communication unit to communicate directly over said PRFN with the second LD in order to convey information such as a preprogrammed sequence of signals which assists locating and recovering said asset. In the event that the second communication unit is enabled for communication on a public radio network 'PRN', the first LD is configured to communicate with any of the operations control centre, the second LD, or the mobile location tracking system on a PRN such as a IEEE802.11 enabled wireless local area network 'WLAN' or an IEEE802.16 enabled wireless metropolitan area network 'WMAN' when it is determined at the first LD that a communication cannot be transmitted between said first LD and any of the operations control centre, the second LD, or the mobile location tracking system using the PMRN.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

The invention claimed is:

1. An asset location system comprising:
    a first locating device ID' associated with a first asset, said first LD having a first wireless communication unit, said first wireless communication unit comprising a public radio network 'PRN' enabled communication unit for communicating over a first PRN with at least one of: an operations control centre 'OCC'; a second LD associated with a second asset; or a mobile location tracking system, said first LD including a second wireless communication unit, said second wireless communication unit using a different wireless technology or protocol to that of the first PRN enabled communication unit, the first LD being configured to use said second wireless communication unit to communicate either:

a) directly over a private radio frequency network 'PRFN' with the second LD associated with the second asset where the second wireless communication unit is a PRFN enabled communication unit; or b) with at least one of the OCC, the second LD associated with the second asset, or the mobile location tracking system on a second PRN using a different technology or protocol to the first PRN, when a communication cannot be transmitted between the first LD and at least one of the OCC, the second LD associated with the second asset, or the mobile location tracking system using the first PRN.

2. The system as claimed in claim 1, wherein the second LD associated with the second asset is configured to relay messages between the OCC or the mobile location tracking system and the first LD associated with the first asset using at least one of the first or second PRNs or the PRFN.

3. The system as claimed in claim 1, wherein the second LD associated with the second asset is configured to relay messages between the OCC or the mobile location tracking system and the first LD associated with the first asset using a third LD associated with a third LD, said third asset being configured to relay messages between the second LD and the OCC or the mobile location tracking system using at least one of the first or second PRNs or the PRFN.

4. The system as claimed in claim 1, wherein the system has a plurality of assets with associated LDs wherein a subset of said LDs is configured to form a mobile mesh wireless network to relay messages between the first LD associated with the first asset and the OCC or the mobile location tracking system, said mobile mesh wireless network being formed over at least one or a combination of the first or second PRNs or the PRFN.

5. The system as claimed in claim 1, wherein the first PRN is a public mobile radio network 'PMRN'.

6. The system as claimed in claim 1, wherein the second PRN is a wireless local area network 'WLAN' or a wireless metropolitan area network 'WMAN'.

7. The system as claimed in claim 6, wherein the WLAN or WMAN is at least one of: a publicly accessible WLAN or WMAN; a publicly subscribable WLAN or WMAN; or a publicly provisioned WLAN or WMAN.

8. The system as claimed in claim 6, wherein the WLAN or WMAN is connectable to the internet for relaying messages between at least one of the first or second LDs and at least one of the OCC, the mobile location tracking system, or another LD associated with another asset.

9. The system as claimed in claim 1, wherein the PRFN is a PRFN assigned to the asset location system.

10. The system as claimed in claim 1, wherein the OCC is configured to activate the first LD associated with the first asset when an alert message is received at the OCC indicating unexpected activity relating to the asset.

11. The system as claimed in claim 1, wherein the unexpected activity relating to the asset is indicative of the asset being moved without permission of the owner of the asset.

12. The system as claimed in claim 10, wherein the OCC uses a unique identifier of the first LD to activate said first LD in a message sent over the first or second PRN or the PRFN to the first LD.

13. The system as claimed in claim 12, wherein the OCC is configured to send the activation message directly to the first LD over at least one of the first or second PRNs or the PRFN.

14. The system as claimed in claim 12, wherein the OCC is configured to send the activation message indirectly to the first LD over at least one of the first or second PRNs or the PRFN via one or more other LDs or an mobile mesh network of LDs.

15. The system as claimed in claim 1, wherein the first LD is configured to receive GPS data from a global position system and to transmit said GPS data to said OCC or said mobile location tracking system over said second PRN if said first PRN is not available, or directly or indirectly to the mobile location tracking system over the PRFN or indirectly to the OCC over the PRFN via at least the second LD.

16. The system as claimed in claim 1, wherein the first LD is configured to determine its possible location via a dead reckoning process or a wireless signal triangulation if no GPS data is available.

17. The system as claimed in claim 1, wherein the OCC is configured to identify a possible search area for the mobile location tracking system to use in tracking the first LD based on a last known location of the first LD and taking into account data such as elapsed time since said last known location was received or a last known time said asset was at its last known location.

18. The system as claimed in claim 1, wherein the OCC is configured to use reported GPS data from at least the second LD to determine a potential search area for the mobile location tracking system to use to track the location of the first LD.

19. The system as claimed in claim 1, wherein the OCC is configured to use reported GPS data from a plurality of other LDs associated with other assets which have communicated at some point in time with the first LD to determine a potential search area for the mobile tracking location system.

20. The system as claimed in claim 1, wherein the OCC is configured to use timing information contained in or derivable from communications received from other LDs associated with other assets which have communicated at some point in time with the first LD to determine a potential search area for the mobile tracking location system.

21. The system as claimed in claim 1, wherein the LDs are configured to attempt wireless communication firstly over the first PRN then over the second PRN and then over the PRFN.

22. The system as claimed in claim 1, wherein the mobile location tracking system comprises at least one of: a motor vehicle; a helicopter, or a satellite communication system with a tracking system.

23. A first locating device 'LD' for an asset location system, said LD comprising:

a first wireless communication unit, said first wireless communication unit comprising a public radio network 'PRN' enabled communication unit for communicating over a first PRN with at least one of: an operations control centre 'OCC'; a second LD associated with a second asset; or a mobile location tracking system; and a second wireless communication unit, said second wireless communication unit using a different wireless technology or protocol to that of the first PRN enabled communication unit;

wherein said first LD is configured to;

a) use said second wireless communication unit to communicate directly over a PRFN with the second LD associated with the second asset where the second wireless communication unit is a PRFN-enabled communication unit; or b) communicate with at least one of the OCC, the second LD associated with the second asset, or the mobile location tracking system on a second PRN using a different technology or protocol to the first PRN;

when a communication cannot be transmitted between the first LD and at least one of the OCC, the second LD associated with the second asset, or the mobile location tracking system using the first PRN.

24. A method of locating an asset using an asset location system in which a first locating device ID' is associated with a first asset, said first LD having a first wireless communication unit, said first wireless communication unit comprising a public radio network 'PRN' enabled communication unit for communicating over a first PRN with at least one of: an operations control centre 'OCC'; a second LD associated with a second asset; or a mobile location tracking system, said first LD including a second wireless communication unit, said second wireless communication unit using a different wireless technology or protocol to that of the first PRN enabled communication unit, the method comprising:

a) using said second wireless communication unit at said first LD to communicate directly over a private radio frequency network 'PRFN' with the second LD associated with the second asset where the second wireless communication unit is a PRFN enabled communication unit; or b) using said second wireless communication unit to communicate with at least one of the OCC, the second LD associated with the second asset, or the mobile location tracking system on a second PRN using a different technology or protocol to the first PRN;

when a communication cannot be transmitted between the first LD and at least one of the OCC, the second LD associated with the second asset, or the mobile location tracking system using the first PRN.

25. An asset comprising part of an asset location system, wherein said asset has integrated therewith a locating device 'LD' according to claim 23.

26. The asset location system of claim 1, wherein the assets are vehicles.

27. The asset locating device of claim 23, wherein the assets are vehicles.

28. The method of claim 24, wherein the assets are vehicles.

29. The asset comprising part of an asset location system of claim 25, wherein the asset is a vehicle.

* * * * *